United States Patent [19]

Iida

[11] 4,441,208

[45] Apr. 3, 1984

[54] PICTURE INFORMATION PROCESSING AND STORING DEVICE

[75] Inventor: Kazuhiko Iida, Yokohama, Japan

[73] Assignee: Tokyo Shibaura Denki Kabushiki Kaisha, Kawasaki, Japan

[21] Appl. No.: 312,980

[22] Filed: Oct. 20, 1981

[30] Foreign Application Priority Data

Oct. 22, 1980 [JP] Japan ................. 55-147914

[51] Int. Cl.³ ............................... H04N 7/12
[52] U.S. Cl. .................... 382/56; 340/347 DD; 358/261
[58] Field of Search ............... 382/56; 340/347 DD; 358/260, 261

[56] References Cited

U.S. PATENT DOCUMENTS

| | | | |
|---|---|---|---|
| 3,739,085 | 6/1973 | Rosen | 382/56 |
| 4,312,018 | 1/1982 | Nakajiri | 358/261 |
| 4,355,306 | 10/1982 | Mitchell | 382/56 |

FOREIGN PATENT DOCUMENTS 52-19022  2/1977  Japan .................. 358/261

Primary Examiner—Howard W. Britton
Attorney, Agent, or Firm—Cushman, Darby & Cushman

[57] ABSTRACT

A picture information processing and storing device includes a page buffer for storing original picture information for one scanning line in each row thereof, a line buffer for storing original picture information for each row, a read only memory in which a run length code to MH code conversion table is stored, and address designation circuit for supplying address data to the read only memory in response to each original picture data read out from said line buffer, a shift register circuit for successively storing data from the read only memory, and an EOL code generator for providing an end-of-line code after MH code data corresponding to original picture information stored in said line buffer when the entire MH code data is stored in the page buffer.

5 Claims, 10 Drawing Figures

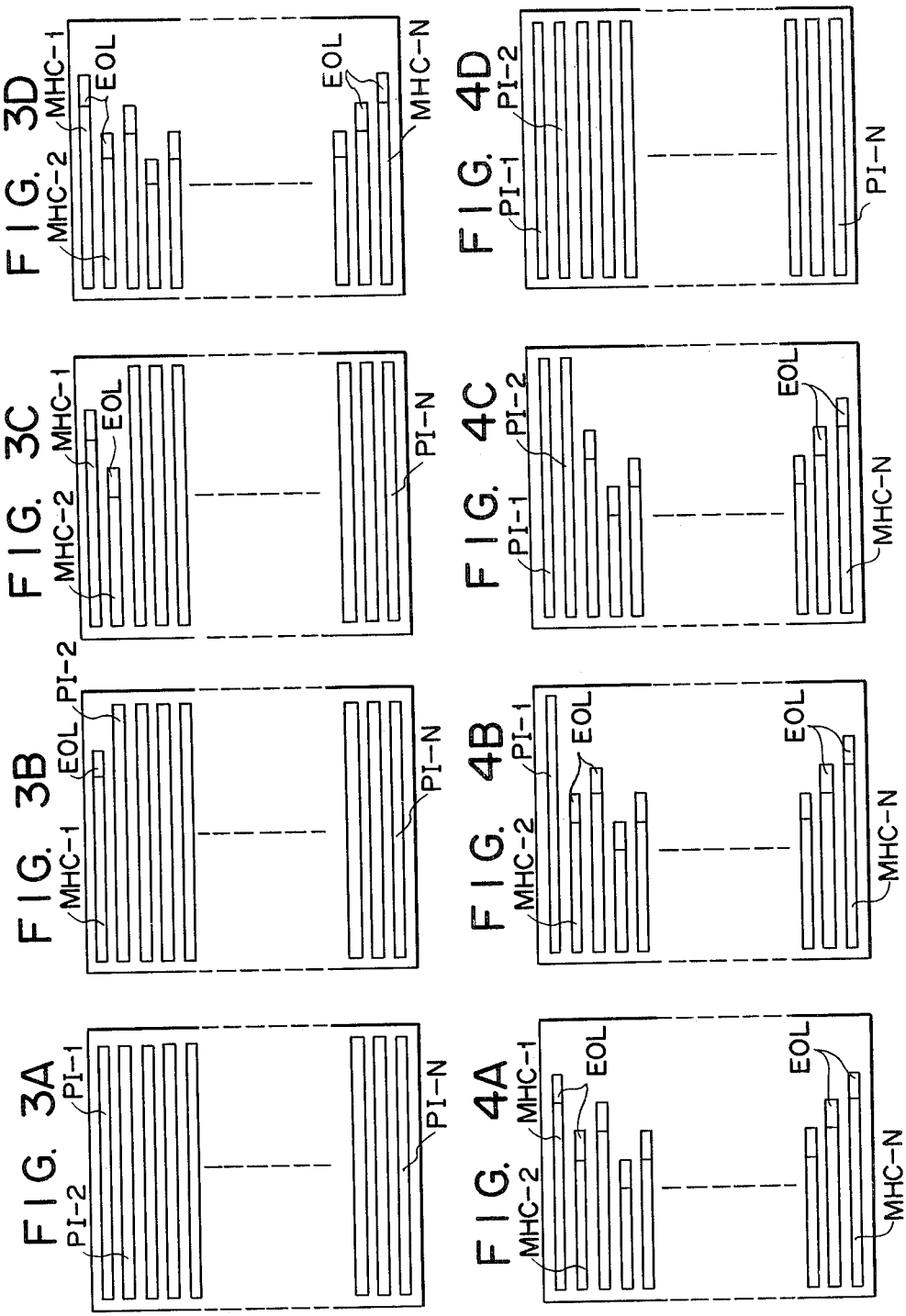

PICTURE INFORMATION PROCESSING AND STORING DEVICE

BACKGROUND OF THE INVENTION

This invention relates to picture information processing and storing devices used for picture information processing apparatus such as document filing apparatus.

Recently, there have been known document filing apparatus for preserving great quantities of document picture information such as information concerning characters and drawings by obtaining electric signals through photoelectric conversion of light signals, which are obtained by scanning the documents or the like in optical two-dimensional scanning, and progressively storing or filing these electric signals in a large capacity storage device. The large capacity storage devices that are used for such document filing apparatus have inherent writing and reading speeds. The reading and writing speeds of the storage devices are often higher than the operation speed of the picture information reading apparatus, which generate electric picture signals by optically scanning documents. In order to obtain smooth transfer of information between the reading unit and storage unit, therefore, a buffer memory or page buffer capable of storing a unit quantity of document picture information, for instance for one page, is usually necessary.

The document picture information read out from a picture information reading device usually includes much redundancy, and directly storing it in the memory results in inferior utility factor of the memory. Accordingly, it has been a practice to code the readout document picture information by using a redundancy suppression system or high efficiency coding system such as MH (Modified Huffman) coding system which is accepted to comply with the international standards by CCITT (International Telegraph and Telephone Consultative Committee) and is used in the fields of facsimile, and store the coded picture information thus obtained by high efficiency coding in a storage device. By so doing, as great quantity of picture information as several ten times that in case of directly storing document picture information can be stored in a memory device having the same memory capacity to obtain an extremely increased memory utility factor.

The MH coding system will be briefly described here. This system uses a one-dimensional run length coding system, in which 1,728 bits, for instance, are used to represent picture information in one scanning line of an A4 size short side. The white or black run lengths contained in one scanning line are each represented by a plurality of successive "0" or "1" bits. With the ordinary document, the average run length of black run often appearing is 0.3 to 0.6 mm, while the average run length of white run often appearing is 1 to 2 mm. In the MH coding system, bits are assigned on the basis of the probability of the white and black run length occurrence; less bits are assigned to run lengths of higher occurrence probabilities, and more bits to run lengths of lower occurrence probabilities. Also, a basic code called a terminating code (T) is solely used for run lengths of 0 to 63 bits, while for run lengths of 64 to 1,728 bits a make-up code represented by $64 \times M$ (M being a positive integer) is used together with the terminating code (T). More particularly, 64 different MH terminating codes are assigned to white and black run lengths of respectively 0 to 63 bits, and M different make-up MH codes are assigned to white and black run lengths of respective $64 \times i$ (i being a positive integer in a range of $1 \leq i \leq M$) bits. For example, a terminating code "10011" is assigned to a white run length of 8 bits, and a terminating code "000101" is assigned to a black run length of 8 bits. MH coding and decoding can thus be realized by using a ROM, in which the relation between the available run lengths and white and black terminating codes and make-up codes is stored. The MH coding and decoding system is explained in detail in the paper "SPECIAL RAPPORTEUR FOR GROUP 3 EQUIPMENT" reported by CCITT (September 1976).

In the prior art document filing apparatus, the original picture information read out line after line from document by the picture information reading device is stored sequentially line after line in a page buffer. When the original picture information for one page has been stored in the page buffer, it is then sequentially supplied from the page buffer to an MH coding and decoding circuit for conversion into MH code, which is then transferred to a main recording unit including a magnetic tape or disc. The original picture information is stored in the page buffer prior to MH coding in order to permit display or printing of the original picture information on the basis of the stored content in the page buffer.

In the MH coding, the original picture information compression factor varies greatly depending upon the content of the original picture information for the line scanned by the main scanning of the reading device, i.e., depending upon the various white and black run lengths; in an extreme case where the document picture information of one scanning line is solely constituted by a single white run length the compression factor is 1/100. Therefore, in order to write MH coded picture information into the main storage device having a fixed writing and reading speed f (bits per second) without use of any dummy code, it is necessary to use a high speed MH coding unit by setting the reading speed of the page buffer to $100 \times f$ (bits per second) or above. However, this requirement is difficult to meet. Usually, therefore, a buffer memory is used for temporarily storing the MH coded picture information from the page buffer. The storage capacity of the buffer memory may be small when storing picture information obtained by MH coding with a high compression factor, but it has to be large when storing MH coded picture information at a low compression factor, for instance MH coded picture information obtained from picture information representing short white and black run lengths alternately occurring many times in one scanning line. For example, for storing read-out picture information obtained by scanning a document having a size of 200 mm $\times$ 300 mm that 8 bits/mm are scanned in the X direction while the document is relatively moved in Y direction by 1 mm with a resolution of 8 lines/mm, a page buffer having a capacity of $200 \times 300 \times 8 \times 8$ bits ($=3.84$ megabits) is necessary. The buffer memory for temporarily storing the MH coded picture information from the page buffer is required to have a storage capacity equal to about one half the storage capacity of the page buffer. Where the buffer memory having such storage capacity is constructed with an IC memory or the like, however, it is inevitable that the entire circuitry is extremely large. In addition, the writing and reading operations for the buffer memory have to be executed simultaneously. This means that the write and read controls must be separately executed and thus complicates the control operation as a whole.

SUMMARY OF THE INVENTION

An object of the invention is to provide a picture information processing and storing device, which can store original picture information and highly efficient coded picture information without use of any extra memory such as a temporary buffer memory having a large storage capacity.

In one mode of the invention, there is provided a picture information processing and storing device, which comprises first buffer memory means for storing original picture information obtained by two-dimensional scanning an original picture or coded picture information obtained through high efficiency coding of the original picture information, second buffer memory means, means for transferring the original picture information stored in the first buffer memory one scanning line after another to the second buffer memory means, and high efficiency coding means for high efficiency coding the original picture information for each scanning line stored in the second buffer means and storing the coded picture information thus obtained together with a specified code provided at the end thereof in the first buffer memory means in the memory location thereof from which the original picture information for a corresponding scanning line has been read out.

According to the invention, original picture information from, for instance, a page buffer is read out for each row and coded by high efficiency coding, for instance MH coding, and the coded picture information thus obtained is stored in the corresponding memory location of the page buffer again. Thus, the original picture information or coded image information can be stored efficiently.

BRIEF DESCRIPTION OF THE DRAWINGS

FIGS. 3A, 3B, 3C, 3D and 4A, 4B, 4C and 4D are views showing different storage status of page buffer for illustrating the operation of the picture information processing and storing device shown in FIG. 2.

DETAILED DESCRIPTION OF THE PREFERRED EMBODIMENT

Figure 1:
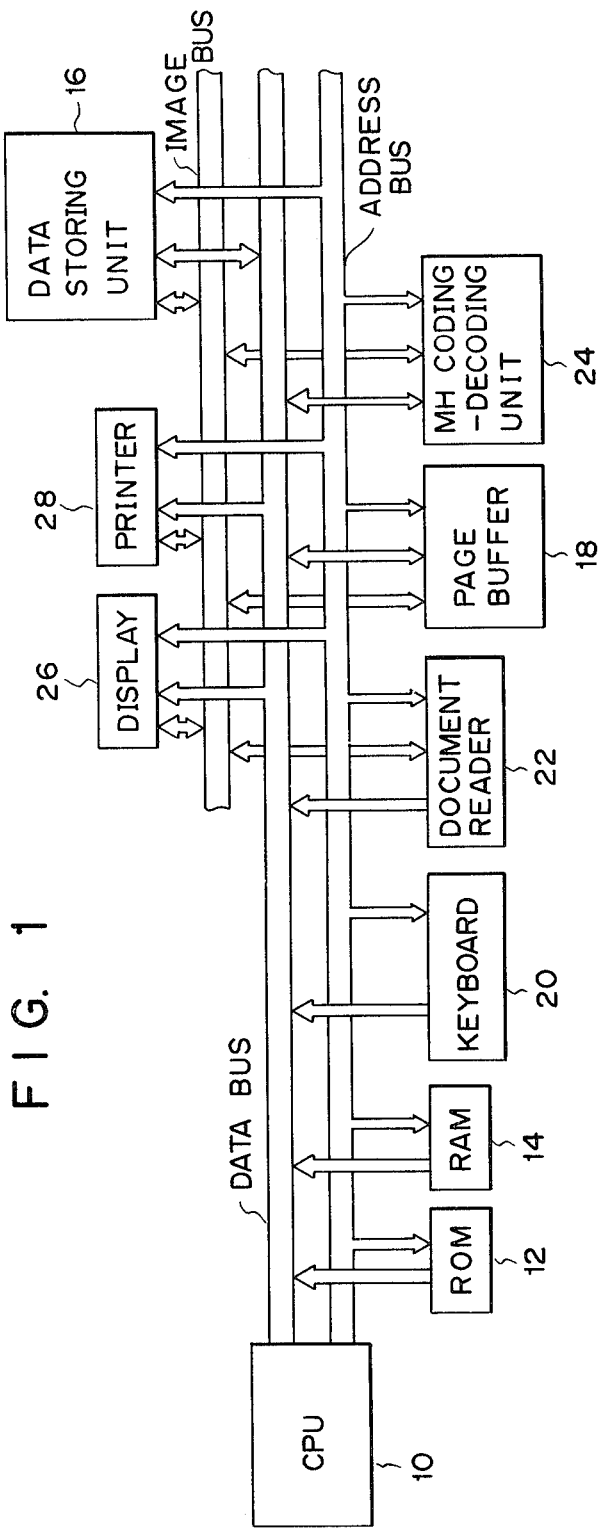
FIG. 1 is a block diagram of a document filing apparatus incorporating a picture information processing and storing device according to the invention.

FIG. 1 shows a document filing apparatus incorporating an embodiment of the picture information processing and storing device according to the invention. The image document filing apparatus includes a central processing unit (CPU) 10, a read only memory (ROM) 12 storing programs to be executed by the CPU 10, a random access memory (RAM) 14 for storing intermediate operation results from the CPU 10, a data storing unit 16 including a recording medium such as a magnetic tape or disc, and a page buffer memory 18. The filing apparatus further includes a keyboard 20 including a start key, a retrieval key, a print key and ten keys (not shown), a reading unit 22 for optically scanning a document in response to the operation of the start key to read picture information on the document and sequentially transfer the read-out picture information to the page buffer memory 18, an MH coding/decoding unit 24 for MH coding original picture information or decoding MH coded picture information stored in the page buffer memory 18, a display unit 26 for displaying the contents of the page buffer memory 18 when original picture information for one page is stored in the page buffer memory, and a printing unit 28 for printing the contents of the page buffer memory 18 when the print key is operated. Further, an image bus is used to couple the storing unit 16 page, buffer memory 18, document reader 22, MH coding/decoding unit 24, display unit 26 and printer 28 so as to permit picture information transfer therebetween. The way of picture information transfer is well known in the art.

In the document filing apparatus shown in FIG. 1, by operating the start key on the keyboard 20, the document reading unit 22 is caused to optically scan the document (not shown) for converting optical picture information obtained for each scanning line after another into corresponding electric picture information, which is sequentially stored on one row after another in the page buffer memory 18. By operating the record key after original picture information for one page has been stored in the page buffer memory 18 at the time of the end of, for instance 300×8 (2,400) scanning, this stored original picture information is sequentially supplied for each row to the MH coding/decoding unit 24 for MH coding to be described in detail hereinafter. The MH coded picture information is also stored in the same row of the page buffer memory 18 as that in which corresponding original picture information has been stored. When all the original picture information stored in the page buffer memory 18 are MH coded and then the MH coded picture information thus obtained are all re-written into the page buffer memory 18, the MH coded picture information is sequentially transferred from the page buffer memory 18 in each row to the data storing unit 16 and stored therein. For reading out the MH coded picture information stored in the data storing unit 16, the retrieval key and ten keys are operated. In this case, selected MH coded picture information is sequentially read out from the data storing unit 16 and stored in one row after another in the page buffer memory 18. Subsequently, this MH coded picture information is read out for one row after another from the page buffer memory 18 and transferred to the MH coding/decoding unit 24 to be converted into the original picture information, which is sequentially stored in the page buffer memory 18. When the loading of the original picture information for one page of picture information in the page buffer memory 18 is ended, display is made on the display unit 26. At this time, by operating the print key, the same information as the displayed picture information on the display unit 16 is printed by the printer 28.

Figure 2:
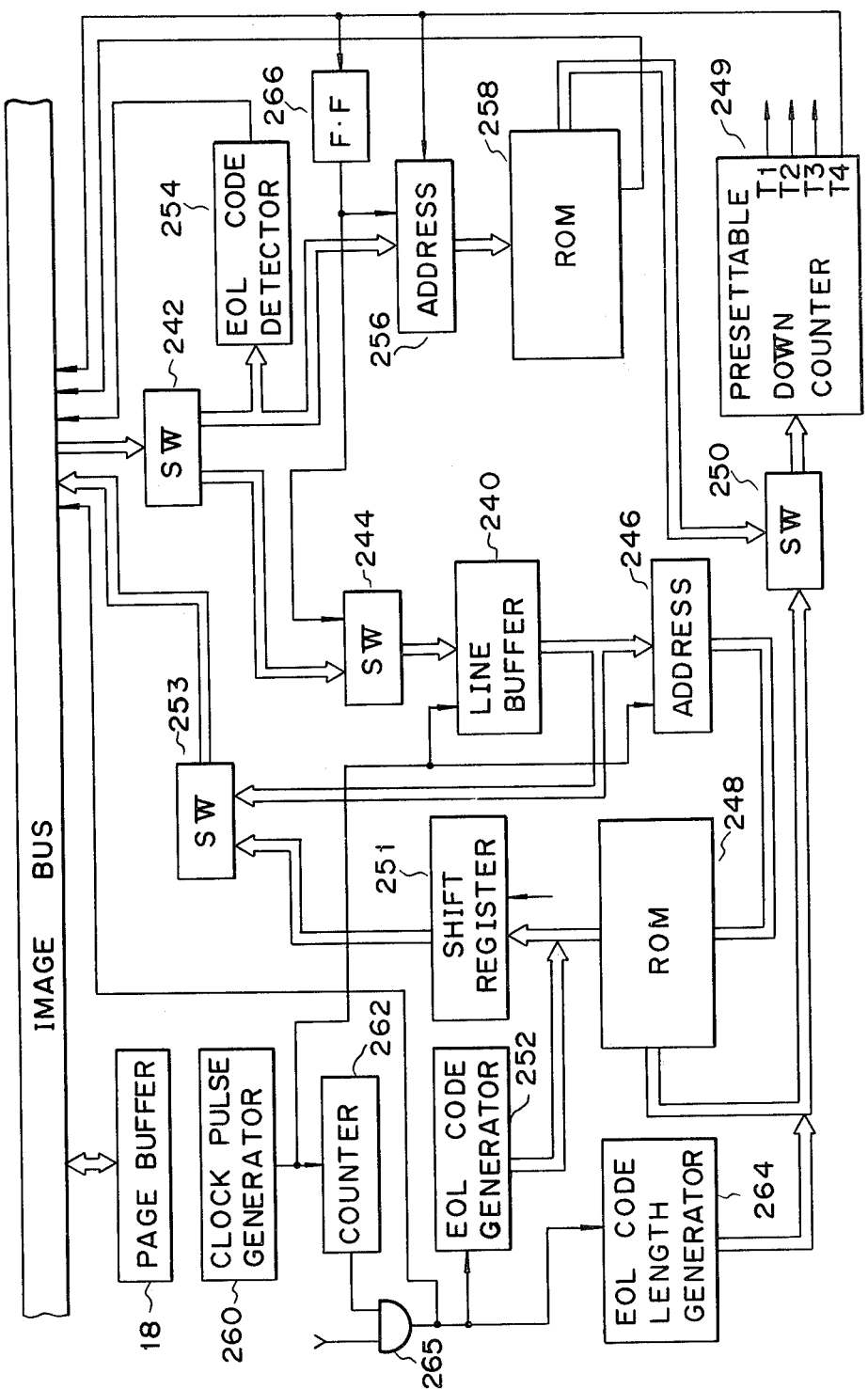
FIG. 2 is a schematic diagram of an embodiment of the picture information processing and storing device according to the invention.

FIG. 2 shows the MH coding/decoding unit 24 of FIG. 1 in detail. First, a circuit section for MH coding original picture information is explained. This MH coding/decoding unit 24 includes a line buffer 240, to which the document picture information from the page buffer memory 18 is sequentially supplied for each row through switching circuits 242 and 244, and an address designation circuit 246, which supplies address data corresponding to the data stored in the line buffer 240 to a ROM 248, in which a run length code to MH code conversion table and code length data representing the bit numbers of the MH codes are stored. The code length data read out from the ROM 248 is supplied through a switching circuit 250 to a presettable down-counter 249 to set the counter 249 to a value corresponding to the read-out code length data. In its first counting mode, the counter 249 is driven by a clock signal to generate a shift pulse for each count-down, and generates a trigger pulse while stopping the counting operation when the count reaches "0". The MH code generated from the ROM 248 is supplied to a shift register 251. The shift register 251 sequentially receives and stores therein the MH codes from the ROM 248 in response to shift pulses from the counter 249, and at the same time shifts out the MH codes previously stored to the page buffer memory 18. After the MH coded data corresponding to the original picture information stored in the line buffer 240 is read out from the ROM 248, the EOL code from the EOL code generator 252 is stored in the shift register 251. Subsequently, the CPU 10 generates a data transfer instruction signal, and the content of the shift register 251 is transferred through a switching circuit 253 to the page buffer memory 18 and stored succeeding to the MH coded data in the page buffer memory 18, thus completing the MH coding for one row of original picture information. Similar MH coding operations are effected for respective rows of original picture information, thus completing the conversion from original picture information to MH coded data for one page.

Now, a circuit section for decoding MH coded information and producing original picture information is explained. The MH coded information from the page buffer memory 18 is supplied through the switching circuit 242 to an EOL detector 254 and an address designation circuit 256. The address designation circuit 256 supplies address data corresponding to the received MH codes to a ROM 258, in which an MH code to run length conversion table or code length data representing the binary code of respective run length code for corresponding MH codes are stored. The run length code read out from the ROM 258 is supplied through the switching circuit 250 to the presettable down-counter 249 to set the counter 249 to a value corresponding to the read-out run length data. In its second operation mode, the counter 249 generates a shift pulse for every one count-down while stopping the counting operation when the count reaches "0". The line buffer 240 receives and stores therein the data representing white or black run from the ROM 258 in response to the shift pulses from the counter 249 until the counter 249 comes to have a value "0". When all the original information corresponding to the MH coded data for one row has been stored in the line buffer 240, it is transferred through a switching circuit 253 to the page buffer memory 18 and stored therein, thus completing the MH decoding operation for MH coded data on one row. Similar MH decoding operations are effected for MH coded data on respective rows, thus completing the conversion from MH coded data to original picture information for one page.

In this embodiment, the line buffer 240 is constituted by a 1,728-stage shift register which is selectively driven by the clock pulse signal from the clock pulse generator 260 or counter 249. The address designation circuit 246 includes, for instance, an address counter for counting "0" or "1" bits successively generated from the line buffer 240. The address counter is cleared by a "0" count signal generated from the counter 249 when the count of the counter 249 reaches "0". The address designation circuit 246 also includes a two-stage shift register for successively receiving data from the line buffer 240 and an exclusive OR circuit for receiving first and second stage output signals from the shift register. In this embodiment, this two-stage shift register is initialized to have its data "0, 0". The output signal from the exclusive OR circuit goes to "1" at the time of the change of the output bit from line buffer 240 from "0" to "1" or from "1" to "0". The address data from the address designation circuit 246 is determined by the content of the address counter and the second stage output signal from the two-stage shift register. The output signal of "1" from the exclusive OR circuit, representing the boundary between white and black runs adjacent to each other, is supplied to a clock signal generator 260 to temporarily interrupt a clock pulse signal from the clock pulse generator 260 and also permit the output signals of the address counter and two-stage shift register to be supplied as address data to the ROM 248.

Now, the operation of the MH coding/decoding unit 24 in a case where the original picture information stored in the page buffer memory 18 is converted into MH coded picture information and then stored in the page buffer memory 18, will be described with reference to FIGS. 3A to 3D. In this case, the CPU 10 sets the switching circuits 242, 244 and 253 to the first switching position and sets the counter 249 to the first operation mode. Assume now that original picture information PI-1 to PI-N respectively representing picture information on the individual scanning lines, as shown in FIG. 3A, are stored in the page buffer 18. In this case, the original picture information for each scanned line is expressed successive bits of "0" (white run) and successive bits of "1" (black run) and, in this example, the total length of the white and black runs is expressed by 1,728 bits. In response to the operation of the second key on the keyboard 20, for instance, CPU 10 permits the first row of original picture information PI-1 in the page buffer 18 to be supplied through the switching circuits 242 and 244 to the line buffer 240 and stored therein. Then, the CPU 10 triggers the clock pulse generator 260 and counter 262 for supplying original picture information bit by bit from the line buffer 240 to the address designation circuit 246. In this example, it is assumed that the first picture data of the original picture information is a white run length code. Thus, if the first output bit of the line buffer 240 is "0", the address designation circuit 246 counts "0" bits successively generated from the line buffer 240. Upon subsequent detection of a "1" bit generated from the line buffer 240, the address designation circuit 246 generates a boundary signal representing the boundary between white and black runs to interrupt a clock pulse signal from the clock pulse generator 260. Accordingly, the count of the counter 246 indicates the white run length. The address data corresponding to the white run length code detected is supplied to the ROM 248. As a result, the corresponding MH code and the code length data representing the bit number of this MH code are read out from the ROM 248. The code length data read out is supplied through the switching circuit 250 to the presettable down-counter 249 to set the counter 249 to a value represented by the code length data read out from the ROM 248. The counter 249, which is thus set to the predetermined count, effects down-counting and supplies shift pulses from its first output terminal T1 to the shift register 251, whereby the MH code from the ROM 248 is transferred into the shift register 251, and at the same time the MH code if previously stored in the shift register 251 is transferred to the same row location in the page buffer memory through the image bus. When the content of the counter 249 becomes "0", the counter 249 supplies a "0" count pulse from its second output terminal T2 to the clock pulse generator 260 and address designation circuit 246, thus completing the MH coding for one white run. Then, "1" bits are successively read out from the line buffer 240 in response to the clock pulse signal from the clock pulse generator 260. When an original picture data of black run is supplied to the address designation circuit 246 in this way, a corresponding MH code is transferred into the shift register 251 subsequent to the first white MH code in the same manner as described before. When the operation is proceeded in this way until the count of the counter 262 is 1,728, i.e., when all the original picture information PI-1 from the line buffer 240 have been read out, the counter 262 provides a count end signal to the clock pulse generator 260 and address designation circuit 246 to interrupt a clock pulse signal from the clock pulse generator 260 and permit address data from the address designation circuit 246 to the ROM 248. As a result, the MH code corresponding to the last picture data in the original picture information PI-1 is written in the shift register 251. At this time, a "0" count signal is generated from a second output terminal T2 of the presettable downcounter 249 when the "0" count thereof is reached, and then supplied through an AND gate 265, which is now enabled by the output signal from the counter 262, to the EOL code generator 252 and EOL code length generator 264. As a result, the EOL code length generator 264 supplies the bit number of the EOL code, i.e., the code length data representing 12 bits, to the counter 249 to set the counter 249 to "12". In response to 12 clock pulses from the counter 249, an EOL code "000000000001" from the EOL code generator 252 is stored in the shift register 251 after the preceding MH code. When the MH code data MHC-1 corresponding to the original picture information PI-1 stored in the line buffer 240, and EOL data have been respectively stored in the page buffer memory 18 and shift register 251, the CPU 10 reads out EOL data from the shift register 251 and stores succeeding to the MH code data MHC-1 in the first row location of the page buffer memory 18 as shown in FIG. 3B.

In a case where the first output bit of the line buffer 240 is "1", the address designation circuit 246 resets the clock pulse generator 260 and supplies an address data indicating that the white run length of 0 to the ROM 248. As a result, an MH code corresponding to the white run length code of 0 is supplied from the ROM 248 to the shift register, and the counter 249 is set to a value corresponding to the bit number of this MH code. Thus, the MH code corresponding to the white run length of 0 is first stored in the shift register 251. Similar operations are subsequently executed, and the MH code data MHC-1 with the EOL code is stored in the first row location as shown in FIG. 3B.

When the first row of the original picture information PI-1 in the page buffer memory 18 has been converted to the MH code data MHC-1 and the MH code MHC-1 is stored together with the EOL code in the first row of the page buffer memory 18, the original picture information PI-2 stored in the second row of the page buffer memory 18 is transferred to the line buffer 240. Subsequently, original picture data are successively read out from the line buffer 240 for MH coding and the MH codes thus obtained are successively stored in the second row location of the page buffer memory 18 in the manner as described before. The MH code data MHC-2 corresponding to the original picture information PI-2 is stored with the EOL code at the end in the second row location of the page buffer memory 18 as shown in FIG. 3C.

The operation of converting the original picture data to MH codes is executed in the way as described, and MH code data MHC-1 to MHC-N corresponding to the original picture information PI-1 to PI-N with the EOL code provided at the end of each MH code data, as shown in FIG. 3D, are stored in the respective first to N-th rows of the page buffer memory 18. When transferring the MH code data obtained through the conversion of the original picture information for one page to the data storing unit 16, MH code data in the first row is sequentially read out from first address bit data until the last bit data "1" of EOL code in the first row is detected. Then, the bit data at the first address of the second row is read out, and then the bit data at the first address of the third row is read out after the last bit data "1" of EOL code in the second row is detected. In this way, the MH code data are successively transferred from the page buffer memory 18 to the data storing unit 16 and filed therein.

Now, the operation of the MH coding/decoding unit 24 in a case where the MH coded picture information stored in the page buffer memory 18 is converted into the corresponding original picture information and stored in the page buffer memory 18, will be described with reference to FIGS. 4A to 4D. In this case, the CPU 10 sets the switching circuits 242, 244 and 253 to a second switching position and also sets the counter 249 to a second operation mode. Assume now that the MH code data MHC-1 to MHC-N as shown in FIG. 4A are stored in the respective first to N-th rows of the page buffer memory 18. In this case, the MH code data MHC-1 stored in the first row of the page buffer memory 18 is first serially supplied through the switching circuit 242 to the EOL code detector 254 and address designation circuit 256.

The address designation circuit 256 receives the MH code data bit by bit from the page buffer memory 18 and produces address data on the basis of all the bit data received and the output signal of a flip-flop 266 showing either white or black run. The address data thus obtained is supplied to the ROM 258. In response to the address data supplied from the address designation circuit 256, the ROM 258 generates a corresponding run length code and supplies a transfer inhibit signal to inhibit the transfer of MH code data from the page buffer memory 18 to the address designation circuit 256. If no run length code corresponding to the address data from the address designation circuit 256 is stored in the ROM 258, the operation of the ROM 258 is suspended until the address data from the address designation circuit 256 is renewed. In this example, the first MH code of the MH code data represents a white run. Therefore, the address designation circuit 256 first supplies address data corresponding to a "0" signal from the flip-flop 266 representing a white run and part or all of the MH code from the page buffer memory 18. If the white MH code from the page buffer memory 18 is imperfect, that is, no effective address data is supplied to the ROM 258 no run length code data is read out from the ROM 258 even when address data is given from the address designation circuit 256 to the ROM 258. When the complete set of MH code is substantially provided from the page buffer memory 18 and effective address data corresponding to this MH code is supplied to the ROM 258, the corresponding run length code is read out from the ROM 258 and a white run signal is supplied through the switching circuit 244 to the line buffer 240. At this time, the code length data represents the number of "0" bits of the white picture data and is supplied through the switching circuit 250 to the presettable down-counter 249 to set the counter 249 to a corresponding count. As a result, the counter 249 supplies clock pulses corresponding in number to the preset count from a third output terminal T3 to the line buffer 240, whereby "0" bit from the flip-flop circuit 266 is sequentially shifted into the line buffer 240 so that corresponding number of "0" bits are stored in the line buffer 240. When the content of the counter 249 becomes "0", a pulse is provided from a fourth output terminal T4 to the address designation circuit 256 and flip-flop 266, thus resetting the address designation circuit 256 to the initial state and causing the flip-flop 266 to generate an output signal "1" representing a black run. The pulse from the output terminal T4 of the counter 249 is also supplied as a transfer instruction signal, thus causing the MH code data to be transferred bit by bit from the page buffer memory 18 to the address designation circuit 256. The address designation circuit 256 produces address data on the basis of the output signal of "1" from the flip-flop 266 and the bit data of the received MH code. The address data thus produced is supplied to the ROM 258. When a perfect set of the second MH code, i.e., black MH code, is provided from the page buffer memory 18, the address designation circuit 256 supplies address data corresponding to this black MH code to the ROM 258, thus causing the corresponding run length code to be read out from the ROM 258 and supplied to the line buffer 240 in the same manner as described before. In this way, white and black MH codes are alternately read out from the page buffer memory 18, and the corresponding white and black picture data are sequentially stored in the line buffer 240. When the last MH code is read out from the page buffer memory 18 and the last picture data corresponding to this last MH code is stored in the line buffer 240, the EOL code is read out from the page buffer memory 18. When this EOL code is detected by the EOL code detector 254, an end signal indicating that the conversion of the MH code data for one line into the corresponding run length data is ended is supplied from the EOL code detector 254. When the original picture information having been stored in the line buffer 240 consists of 1,728 bits (this can be recognized through counting of the clock pulses from the counter 249, for example), then, the original picture information PI-1 is transferred to the first row of the page buffer memory 18 for storing therein as shown in FIG. 4B.

The CPU 10 then reads out the MH code data MHC-2 bit by bit from the second row of the page buffer memory 18 and reads out the run length codes corresponding to the individual MH codes from the ROM 256. Based on the run length codes thus read out successively, picture data of white and black runs are supplied to the line buffer 240 and stored therein bit by bit. When the original picture information PI-2 corresponding to the MH code data MHC-2 has been entirely stored in the line buffer memory 240, the original picture informtion PI-2 is supplied from the line buffer memory 240 to the page buffer memory 18 and stored in the second row thereof as shown in FIG. 4C.

The operation of converting MH code to run length code is executed in the way as described, and the original picture information code data corresponding to the MH code data MHC-1 to MHC-N are stored in the first to N-th rows of the page buffer memory 18 as shown in FIG. 4D. In this way, the conversion of the MH code data for one page into the corresponding original picture information is obtained.

While the invention has been described in conjunction with a preferred embodiment thereof, the embodiment is by no means limitative. For example, while the above embodiment has used MH coding and decoding as the high efficiency coding and decoding, other run length coding and decoding may also be used.

What is claimed is:

1. A picture information processing and storing device comprising:
   first buffer memory means for storing original picture information read out through two-dimensional scanning of an original picture or coded picture information obtained through high efficiency coding of said original picture information;
   second buffer memory means;
   means for transferring the original picture information stored in said first buffer memory one scanning line after another to said second buffer memory means; and
   high efficiency coding means for high efficiency coding the original picture information for one scanning line stored in said second buffer means and storing the coded picture information thus obtained together with a specified code provided at the end thereof in said first buffer memory means in the memory location thereof from which said original picture information for one scanning line has been read out.

2. A picture information processing and storing device according to claim 1, which further comprises:
   high efficiency decoding means for receiving the coded picture information stored in said first buffer memory means for each high efficiency code, and decoding the individual high efficiency codes to recover and store the original picture information in said second buffer memory means; and
   specified code detecting means for producing a signal indicating that the coded picture information for one scanning line stored in said first buffer memory means has all been received at the time of the detection of said specified code.

3. A picture information processing and storing device according to claim 1 or 2, wherein said original picture information is converted into run length codes representing the lengths of white and black runs, and said high efficiency coding means includes:
   an address designation circuit for generating address data corresponding to each run length code read out from said second buffer memory means;
   a read only memory for generating a high efficiency code in response to corresponding address data from said address designation circuit;
   a shift register circuit for successively storing therein the high efficiency codes from said read only memory; and
   a specified code generating circuit for storing a specified code in said shift register circuit when it is detected that the high efficiency codes corresponding to the original picture information stored in said second buffer memory means have all been stored in said shift register circuit.

4. A picture information processing and storing device according to claim 3, wherein said high efficiency decoding means includes:
   an address designation circuit for detecting a high efficiency code supplied from said first buffer memory means and generating address data corresponding to the detected high efficiency code; and
   a read only memory for supplying original picture information of white and black runs corresponding to run length code to said second buffer memory means in response to the corresponding address data supplied from said address designation circuit.

5. A picture information recording system according to claim 2, wherein said high efficiency decoding means includes:
   an address designation circuit for detecting a high efficiency code supplied from said first buffer memory means and generating address data corresponding to the detected high efficiency code; and
   a read only memory for supplying original picture information of white and black runs corresponding to run length code to said second buffer memory means in response to the corresponding address data supplied from said address designation circuit.

* * * * *